US009325958B2

(12) United States Patent
Blayney

(10) Patent No.: US 9,325,958 B2
(45) Date of Patent: Apr. 26, 2016

(54) BROADCASTING AND DETECTION SYSTEM AND METHOD

(71) Applicant: Eric Blayney, Kingwood, TX (US)

(72) Inventor: Eric Blayney, Kingwood, TX (US)

(*) Notice: Subject to any disclaimer, the term of this patent is extended or adjusted under 35 U.S.C. 154(b) by 59 days.

(21) Appl. No.: 13/969,299

(22) Filed: Aug. 16, 2013

(65) Prior Publication Data
US 2014/0050460 A1 Feb. 20, 2014

Related U.S. Application Data

(60) Provisional application No. 61/683,821, filed on Aug. 16, 2012.

(51) Int. Cl.
H04N 5/783 (2006.01)
H04N 5/93 (2006.01)
H04N 7/10 (2006.01)
H04N 9/79 (2006.01)
H04N 5/76 (2006.01)
H04N 7/025 (2006.01)
H04N 9/82 (2006.01)

(52) U.S. Cl.
CPC . H04N 9/79 (2013.01); H04N 5/76 (2013.01); H04N 9/8205 (2013.01)

(58) Field of Classification Search
USPC ......... 386/343, 345, 346, 347, 348, 349, 350, 386/351, 352, 353, 326; 725/32
See application file for complete search history.

(56) References Cited

U.S. PATENT DOCUMENTS

| 2004/0034874 | A1* | 2/2004 | Hord et al. | 725/136 |
|---|---|---|---|---|
| 2005/0002644 | A1* | 1/2005 | Nakamura et al. | 386/52 |
| 2010/0218208 | A1* | 8/2010 | Holden | 725/32 |

* cited by examiner

*Primary Examiner* — Daquan Zhao
(74) *Attorney, Agent, or Firm* — Bushman Werner, P.C.

(57) ABSTRACT

A system and method is provided for publicly broadcasting and user display of video frames or groups of video frames of program content. A program content processor is utilized with an added material processor to insert added material to a limited number of the video frames or groups of video frames of the program content. A broadcasting device configured to broadcast the program content with the added material to a plurality of users who can selectively receive the program content. A controller operable for selectively controlling a speed of the playback of the program content so that the added material becomes readily discernible by the user. An electronic response device is utilized by the user to respond to the now user detectable added material.

6 Claims, 1 Drawing Sheet

BROADCASTING AND DETECTION SYSTEM AND METHOD

CROSS REFERENCE TO OTHER PATENT APPLICATIONS

This application claims priority to U.S. Provisional 61/683,821, filed on Aug. 16, 2012, the disclosure of which is incorporated herein by reference for all purposes.

BACKGROUND OF THE INVENTION (1) Field of the Invention

The present invention relates generally to television transmission and, more particularly, to a method for embedding and detecting information utilizing, in one embodiment, a video recorder operable for inspecting individual frames or groups of frames for the embedded information.

(2) Description of the Prior Art

The common use of a video recorder by consumers viewing television program content broadcasts permits consumers more freedom with control of the video content by recording and then playing back the program content at a convenient time.

While this has many benefits, in some cases there are concerns by advertisers, program content providers, or others as to obtaining the attention of consumers.

Presently, options to increase the attention of consumers is largely a matter of program content. The present invention provides an improved manner of directing the attention of consumers without the need to change the underlying program content. Accordingly, those of skill in the art will appreciate the present invention which addresses the above and other concerns.

SUMMARY OF THE INVENTION

Accordingly, it is an object of the present invention to provide an embedding/display system and techniques for television programming.

Another object of the present invention is to provide means for advertisers, other program content providers, and the like, to provide added and/or relatively hidden material which may or may not be related to the underlying program content, which added information may or may not be actually or practically viewable or detectable without use of a video recorder, i.e., in real time.

In accordance with one possible embodiment of the present invention, a system for broadcasting and display is provided comprising a program content processor operable to produce program content. An added material processor is operable to add material to a limited number of frames or groups of frames in the program content. A broadcasting device is operable for broadcasting the program content with the added material. A video recorder is selectively operable for recording and playback of the program content on at least one of a display and/or sound output, TV, monitor, or the like. A controller is operable for use by a user for limiting a speed of the playback of the program content and/or for stopping and/or replaying the program content. The video recorder is operable to produce images and/or sounds which may not be readily discernible without use of the controller and the video recorder for limiting the speed of playback of the program content and or for stopping and/or for replaying the program content. The added material may comprise hidden clues, which can be detected by a user who utilizes the controller to view the frames more slowly, by stopping, and/or replaying and then operates a response device to make a response to the hidden clues.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DETAILED DESCRIPTION OF THE INVENTION

Figure 1:
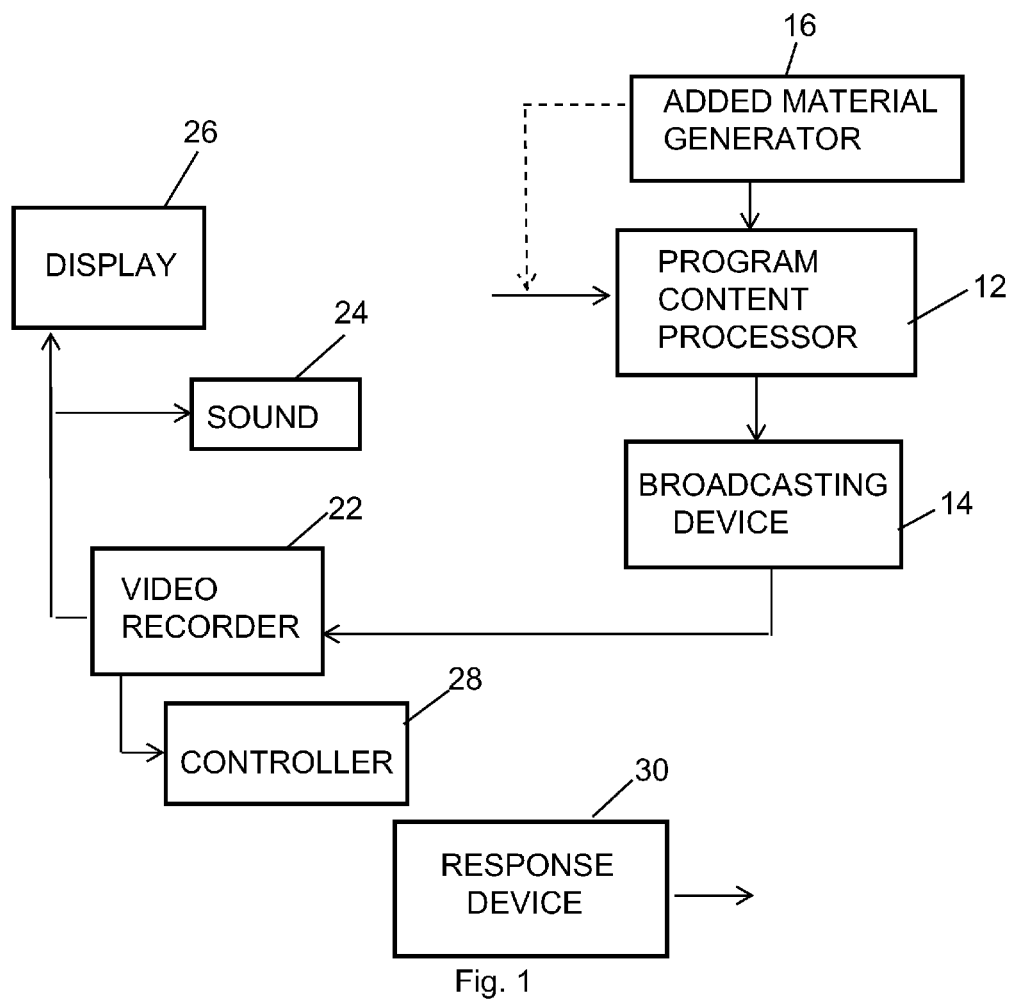
FIG. 1 is a simplified block diagram for a system to include and detect added information in accord with one possible embodiment of the invention.

Referring now to the drawings, and more particularly to FIG. 1, there is shown system 10, which may be utilized to provide additional entertaining content to a user in accord with one possible embodiment of the invention.

Program content processor 12 prepares program content for broadcasting by broadcasting device 14. Program content is created in the standard way utilizing cameras, computer simulations, and the like. Program content may be considered as any content that would be broadcast by any content provider including cable companies, satellite companies, over the air broadcasting, Internet broadcasting, and the like. In one possible embodiment, commercials are considered to be a special type of program content wherein material is added to particular frame(s), which is not readily viewable or detectable by the user when viewed at normal frame rates or in real time but which become visible when the frame rate is slowed down or stopped. Program content processor 12 and broadcasting device 14 may comprise many devices, combinations, systems, and the like operating or being operated at different locations and/or being configured in many different ways.

At any point in the process of creating program content, either during the creation or afterwards, added material generator or processor 16 may be utilized to insert the added material into the program content. In one possible embodiment, added material generator or processor 16 may be utilized to insert or effectively hide added information into a limited number of frames. Added material generator 16 may comprise many different machines or devices or systems or configurations.

Figure 2:
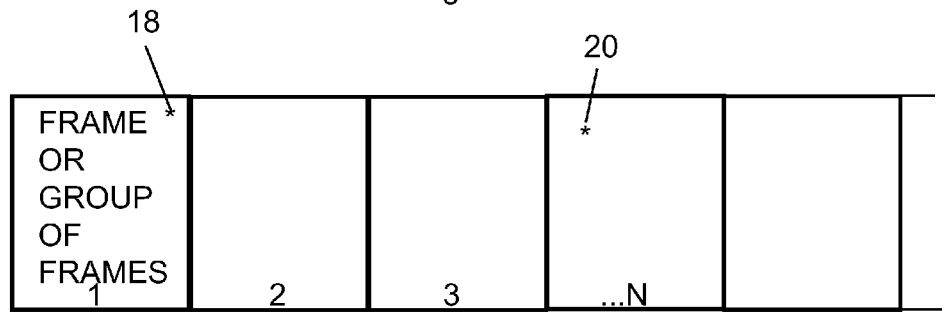
FIG. 2 is a conceptual diagram showing video broadcast frames, some of which include added information which may not be readily discernible during normal, e.g., real time, viewing of the underlying content in accord with one possible embodiment of the present invention.

FIG. 2 provides a simplified example of the added material 18 and 20, which is placed in selected frames or groups of frames. The frames or groups of frames include program content. To this program content, additional information is inserted. In this case, added material 18 is provided in frame or group of frames 1, which also includes program content. Frame or group of frames 2 has only the program content. Frame or group of frames N includes program content as well as added material 20. It will be appreciated that there are many frames and that added material 18 and 20 are placed in only selected of the frames or groups of frames. By frames it is meant pictures that are shown for only a very short time, which may be like frames in movie films or the like. In order for the human eye to detect information in the frame, it must be visible for a certain amount of time and if not then the information is not readily visible by a user. In one possible embodiment, the present invention can take advantage of this fact to effectively hide information or added material in certain frames or groups of frames.

Added material 18 and added material 20 may typically comprise added visual information and/or added sound information. As discussed hereinafter, in one possible preferred embodiment, the information is not readily, easily, or perhaps not realistically detectable by a user unless the frame rate is slowed down and/or stopped during display or playback.

Video recorder 22 is utilized to record visual and sound information of any type produced by broadcasting device 14. Video recording 16 provides this information to sound output 24 and display 26.

Controller 28 is utilized by the user for controlling the output of video recorder 22, especially the speed of the display. In one possible embodiment, the controller 28 is utilized by the user to locate added information such as added material 18 and/or 20 by slowing down or stopping the frame rate so that the information becomes visible.

In one embodiment, added material 18 and added material 20 may comprise visual information that is detected by the user and then combined in some way. For example, added material 18 added material 20 may comprise a visual clue that has value of some type to the user once detected. The value may be of various forms such as entertainment value, prizes, discounts, and the like.

For example, the added material may be added within a commercial so that detecting the clues becomes a treasure hunt of some type. This may be in the form of special offers, gifts, benefits, or the like. Advertisers may be motivated to provide this type of content to advertising program information to increase attention to the underlying advertisements, which the user will watch in order to detect the clues, or the like. The new material may be separate from the other program content, responsive to questions asked during a commercial and/or may be used with or require a response. For example, response device 30 may be used in conjunction with controller 28 to respond to the added material detected by a user. Response device 30 might comprise a computer, cell phone, or the like.

For the above example, in one embodiment the added material processor 16 may be used to place the added material, e.g., a clue or clues, in a very limited number of frames such that by going slowly, stopping, reversing, displaying at different speeds including fast and slow speeds and/or combinations of the above that the material is detectable by the user. As another possibility, added material may be filmed into the program content as a program is produced, such as by insertion and removal of certain props or the like during filming and/or cutting.

The material might be visual or auditory. For example, background sounds may contain information that may not be readily detectable unless it is possible to stop and replay the program material.

In another embodiment, new material 18 and 20 might be added to cartoons or the like to provide various games, for children and/or adults entertainment. The new material may be in a very limited number of frames or may be provided in many different frames.

As only one possible example of operation, a treasure hunt game may be provided which requires users to search through a commercial by slowing the frame rate speed, stopping the display to inspect the picture, reversing, replaying, and the like, to find hidden added information 18 and 20. In this example, the information is hidden because the human eye cannot detect the added information at normal frame rates, requiring use of the video recorder speed controls to view the otherwise hidden information. After the information is detected, response device 30 may be utilized by the user to communicate that the information was detected and thereby obtain a reward or "treasure". Prizes and are other benefits may be provided to users who are able to locate, detect and cipher the added information 18 and 20. There may be time limitations and so forth.

In another embodiment, the present invention may be conducted in a real time manner in the sense that the added material, e.g., clue(s), can and/or has to be detected at the time the program content is being broadcast. Thus, in one embodiment, the present invention would not necessarily require a video recorder and/or a controller albeit it would require the use of some or all of the components set forth in FIG. 1. Thus, by using the present invention, in one embodiment, in the real time broadcasting of the program contents, the advertiser could be assured that when a commercial is on as part of the overall program content, the viewer would remain watching the program content while the commercial is being played. This would be especially true if the answer/response had to be submitted as soon as the embedded material was detected.

In still another embodiment of the present invention, the added material, e.g, the clues, could be incorporated into the programming such that some could be readily detected in real time whereas others would require closer examination of the content, e.g., by use of the a video recorder. Accordingly, the game could be set up such that the clues detected in real time would yield an answer(s) entitled to one type of prize whereas the clues which, because of their brief nature in the programming, would require a video recorder, to yield an answer(s) entitled to a different prize. It will be apparent that numerous combinations, permutations and the like can be made between real time viewing the recorded viewing, the type of clues, the presentation of the clues, etc. to provide an almost endless list of possibilities to maximize the viewer's attention to the commercials, for example, of the programming content.

It will be understood that many additional changes in the details, materials, steps and arrangement of parts, which have been herein described and illustrated in order to explain the nature of the invention, may be made by those skilled in the art within the principle and scope of the invention.

Accordingly, the foregoing description of the preferred embodiments of the invention has been presented for purposes of illustration and description only. It is not intended to be exhaustive nor to limit the invention to the precise form disclosed; and obviously many modifications and variations are possible in light of the above teaching. Such modifications and variations that may be apparent to a person skilled in the art are intended to be included within the scope of this invention.

The invention claimed is:

1. A system for publicly broadcasting video frames or groups of video frames of program content and for user display of said video frames or groups of video frames of program content by a plurality of users, comprising:

an added material processor configured to insert added material into a limited number of said video frames or groups of video frames of said program content, whereby at least a portion of said added material within said video frame or group of video frames is discernible by said plurality of users when played at real time and at least another, separate portion of said added material within said video frame or group of video frames is not readily discernible by said plurality of users when played at real time and becomes user discernible when said program content is stopped at a selectable video frame;

a public broadcasting device configured to broadcast said program content with said added material to said plurality of users who can selectively receive said program content;

a plurality of video recorders selectively operable by respective of said plurality of users for recording and playback of said program content;

a plurality of controllers operable by said plurality of users for selectively controlling a speed of said playback of said program content, wherein by controlling said speed of said playback for selected of said video frames or groups of video frames that said added material becomes discernible; and a plurality of response devices configured for responding to said added material by sending an electronic signal to at least one designated receiver, wherein said added material comprises at least one of a game or prize.

2. The system of claim 1, wherein said added material processor is operable to hide said added material by controlling insertion of said added material to a limited number of said video frames or groups of video frames of program content, whereby said added material is hidden until said program content is replayed at a playback speed that is different than said normal viewing speed.

3. The system of claim 1, wherein said added material comprises at least one of visual or auditory information.

4. A method for public broadcasting of video frames or groups of video frames of program content and display of said video frames or groups of video frames of program content by a plurality of users, comprising:

inserting added material to a limited number of said video frames or groups of video frames of said program content;

broadcasting said program content through publicly accessible media with said added material;

providing each of said plurality of users with a video recorder selectively operable for recording and playback of said program content whereby at least a portion of said added material within said video frame or group of video frames is discernible by said plurality of users when played at real time and at least another, separate portion of said added material within said video frame or group of video frames is not readily discernible by said plurality of users when played at real time and becomes discernible when said video frame or groups of video frames of program content are stopped at one or more selectable video frames;

providing each of said plurality of users with a controller operable for selectively controlling a speed of said playback of said program content, wherein by controlling said speed of said playback for selected of said video frames or groups of video frames that said added material becomes user discernible; and providing each of said plurality of users with a response device operable for responding electronically to said added material by sending an electronic signal to at least one designated receiver, wherein said added material comprises at least one of a game or prize and said step of responding electronically is based on game rules or prize rules.

5. The method of claim 4, further comprising hiding said added material within said program content by insertion into a limited number of video frames or groups of video frames of program content until said video frames or groups of video frames of program content is replayed at a different speed than said normal speed.

6. A method for public broadcasting of video frames or groups of video frames of program content and display of said video frames or groups of video frames of program content by a plurality of users, comprising:

inserting added material to a limited number of said video frames or groups of video frames of said program content; and broadcasting said program content through publicly accessible media to a plurality of users with said added material whereby said added material is not readily discernible by said plurality of users when played at a normal viewing speed;

providing that said added material becomes user discernible by said plurality of users during playback of said program content by stopping said video frames or groups of video frames of program content at one or more selectable video frames; and providing each of said plurality of users with a response device operable for responding electronically to said added material by sending an electronic signal to at least one designated receiver, wherein said added material comprises at least one of a game or prize and said step of responding electronically is based on game rules or prize rules.

* * * * *